(12) United States Patent
Mizuno et al.

(10) Patent No.: US 8,084,098 B2
(45) Date of Patent: Dec. 27, 2011

(54) COATING METHOD OF BUILDING BOARD

(75) Inventors: Daizou Mizuno, Nagoya (JP); Yoshinori Hibino, Ama-gun (JP)

(73) Assignee: Nichiha Corporation, Nagoya-Shi (JP)

( * ) Notice: Subject to any disclaimer, the term of this patent is extended or adjusted under 35 U.S.C. 154(b) by 296 days.

(21) Appl. No.: 12/230,982

(22) Filed: Sep. 9, 2008

(65) Prior Publication Data

US 2009/0068370 A1 Mar. 12, 2009

(30) Foreign Application Priority Data

Sep. 10, 2007 (JP) ................................ 2007-234699
Oct. 11, 2007 (JP) ................................ 2007-265237

(51) Int. Cl.
*B05D 1/30* (2006.01)
(52) U.S. Cl. .... 427/420; 427/284; 427/348; 118/DIG. 4
(58) Field of Classification Search ................ 427/209, 427/284, 348, 420; 118/DIG. 4
See application file for complete search history.

(56) References Cited

U.S. PATENT DOCUMENTS

| | | | | |
|---|---|---|---|---|
| 2,402,633 | A | * | 6/1946 | Johnson et al. ............ 144/198.1 |
| 3,038,441 | A | * | 6/1962 | Wamsley ........................ 118/63 |
| 3,402,086 | A | * | 9/1968 | Smith et al. .............. 156/244.24 |
| 3,508,947 | A | * | 4/1970 | Hughes ........................ 430/538 |
| 4,173,662 | A | * | 11/1979 | Stewart, Jr. .................. 427/115 |
| 4,239,823 | A | * | 12/1980 | Alcaraz et al. ................ 427/420 |
| 6,013,350 | A | * | 1/2000 | Mizuno ........................ 428/172 |

FOREIGN PATENT DOCUMENTS

| | | | |
|---|---|---|---|
| JP | 51-81883 | A | 7/1976 |
| JP | 59-142870 | A | 8/1984 |
| JP | 62-038272 | A | 2/1987 |
| JP | 5-004441 | A | 1/1993 |
| JP | 9-141189 | A | 6/1997 |
| JP | 10-202158 | A | 8/1998 |
| JP | 2000189886 | A * | 7/2000 |
| JP | 2003-1155 | A | 1/2003 |
| JP | 2007-198098 | A | 8/2007 |

OTHER PUBLICATIONS

Tripathi et al "New Curtain Coating Technology Offers Benefits for Barrier-Coated Grades" TAPPI Solutions, 89 (7) Jul. 2006 p. 24-27.*

* cited by examiner

*Primary Examiner* — Nathan Empie
(74) *Attorney, Agent, or Firm* — Birch Stewart Kolasch & Birch, LLP

(57) ABSTRACT

A coating method of building board having convexoconcave in surface comprises the first process that coating is supplied and stocked in a tank installed above on a transportation line which transports the building board with making surface of the building board into the upper position, the second process which the building board is passed under the tank, and coating is flowed down like waterfall by weight of the coating from a drain hole which is installed in the lower end of the tank, and it coats the whole surface and the whole edge of building board with coating enough, wherein width of the drain hole in vertical direction to travelling direction of the building board is wider than width of the building board in vertical direction to travelling direction, and amount of coating to the surface of the building board is 1200-1800 g/m².

7 Claims, 16 Drawing Sheets

COATING METHOD OF BUILDING BOARD

BACKGROUND OF THE INVENTION

This application claims priority under 35 U.S.C. §119 to Japanese Patent Application No. 2007-234699 filed on Sep. 10, 2007 and Japanese Patent Application No. 2007-265237 filed on Oct. 11, 2007, the entire disclosure of which is incorporated herein by reference in its entirety.

1. Field of the Invention

The present invention relates to coating method of building board having convexoconcave in surface. More specifically, the present invention relates to coating method of building board coats the whole surface of the building board and the whole edge of the building board enough with coating while transporting the building board.

2. Description of the Related Art

The following description sets forth the inventor's knowledge of related art and problems therein and should not be construed as an admission of knowledge in the prior art.

In general, a design by convexoconcave is given in surface of building board, and it is tended to improve a good appearance. And it is usual to coat surface having convexoconcave and edge with coating for improving an appearance more and controlling alteration of physical property such as dimension by water absorption in the building board. In addition, edge of building board has shiplap portion to install the building board with another building board disposed by top and bottom and right and left.

An example of building board is shown in FIG. 15. Building board A shown by FIG. 15 has a lot of convex portions A7 of block which are protruded in surface, so that building board A has convexoconcave in surface by a lot of convex portions A7. In addition, edge comprises an edge having edge side face A5, an edge having edge side face A6, an edge having upper shiplap portion A1 and edge side face A2, and an edge having lower shiplap portion A3 and edge side face A4. Upper shiplap portion A1 is formed on an edge of building board A by cutting from a back side of building board A partly, and upper shiplap portion A1 is formed on edge whole area by making notch on the edge whole area. In addition, lower shiplap portion A3 is formed on another edge of building board A which is different from upper shiplap portion A1 of building board A by cutting from a front side of building board A partly, and lower shiplap portion A3 is formed on edge whole area by making notch on the edge whole area. In addition, notch of upper shiplap portion A1 is formed more greatly than notch of lower shiplap portion A3. Therefore, when building board A is attached in external wall of building, upper shiplap portion A1 is able to engage with lower shiplap portion of other building board, and lower shiplap portion A3 is able to engage with upper shiplap portion of another building board, so that external wall of building can be comprised by building boards.

As method to coat with coating for described above building board, there are a brushing method, a roll coater method, a spraying method and a curtain coater method.

In the brushing method, building board is coated with coating by touching a brush having coating.

In the brushing method of building board having shiplap portion in edge, the edge and surface of the building board are coated with coating by touching a brush having coating, but it is difficult to touch the brush to the edge and the surface of building board in uniformity and to touch while transporting the building board. In addition, it is more difficult in building board of large size and/or building board having a design by convexoconcave in surface. Therefore, there is danger that a portion where coating is insufficient occurs, so that it influences physical property and appearance of building board. Moreover, the brush is worn by touching building board directly, so that the brush is easy to be transformed, and a replacement is necessary immediately.

In the roll coater method, it makes coating in surface of roll by soaking one part in surface of rotating roll, and the coating are moved to building board via the roll. In the roll coater method, coating in surface of roll are moved to a portion of building board which the roll touched, so that the coating is able to coat the building board while transporting the building board. In addition, if surface of building board is smooth, coating moves in the surface, and the surface of building board is coated with coating enough. However, in building board having a design by convexoconcave in surface, concave portion of the building board cannot touch in roll, so that coating cannot be moved into the concave portion of building board. Therefore, there is danger that a portion where coating is insufficient occurs, so that it influences physical property and appearance of building board. In addition, edge having shiplap portion is convexoconcave, so that the edge cannot touch with the roll in the whole, and coating cannot be moved into the edge. Therefore, there is danger that a portion where coating is insufficient occurs, so that it influences physical property and appearance of building board. Furthermore, surface of building board and edge having shiplap portion cannot be coated with coating at the same time. And when coating is circulated, debris of building board tends to be contaminated, and the debris attaches to roll, so that there is danger that a portion where coating is insufficient occurs. In addition, a condition of coating is affected by viscosity of coating to use, so that viscosity of coating must be controlled.

In the spraying method, building board is coated with coating by spraying coating from a apical nozzle. In the spraying method, coating is sprayed in surface of building board, so that the coating is able to coat the building board having a design by convexoconcave in surface while transporting the building board. However, coating condition of concave is different from coating condition of convexity, so that there is danger such as a portion where coating is insufficient occurs in slope of convexoconcave and/or a portion where coating is gathered occurs in concavity. Therefore, it influences physical property and appearance of building board.

In addition, there is a method to spray coating on towards an edge of building board from the diagonal lower position to coat the edge of building board having shiplap portion. However, coating is sprayed from the lower position, so that there is danger such as adhesion of coating is bad and/or spray is easy to be clogged up. Alternatively, there is other method to spray coating on shiplap portion by inverting building board. However, it is necessary for inverting building board in the method, so that it is inefficient. And there is danger that coating does not reach to the depths of shiplap portion by shape of the shiplap portion, and a portion where coating is insufficient occurs.

Furthermore, when coating is circulated, debris of building board tends to be contaminated, and a apical nozzle of spray is clogged with the debris, so that there is danger that a portion where coating is insufficient occurs. At Japanese Patent Laid-Open No. 2003-1155, a method that a rate of flow of coating supplied in nozzle of spray is measured with flowmeter and is managed is disclosed. However, the method detects inconvenience such as clog of nozzle quickly, clog of nozzle cannot be prevented. In addition, bubble is easy to occur in coating because a spraying method is to pressurize the coating and to blow the coating, so that an antifoaming agent is necessary in large quantities. As the side effect, there is danger such as harmful effect to formability of coating film and/or harmful effect to adhesion of other coating by the coating repelling in the next process where other coating is coated. In addition, a condition of coating is affected by viscosity of coating to use, so that viscosity of coating must be controlled.

In the curtain coater method, it makes curtain of coating by overflowing from a side wall of coating storage, and building board is coated with coating by passing through the curtain of coating. If surface of building board is smooth, the curtain coater method can coat the surface of building board with coating uniformly. However, amount of coating to the surface of building board by the curtain coater method is only around 120 g/m². Therefore, in building board having convexoconcave in surface, coating can coat slope of convexoconcave disposed in a travelling direction side of transportation, but coating can not coat slope of convexoconcave disposed in a reverse side to travelling direction of transportation, and there is danger that a portion where coating is insufficient occurs, so that it influences physical property and appearance of the building board.

In addition, for coating edge of building board having shiplap portion, the building board is inverted and passes through the curtain of coating. However, it is necessary for inverting the building board in the method, so that it is inefficient. And there is danger that coating does not reach to the depths of shiplap portion by shape of the shiplap portion, and a portion where coating is insufficient occurs.

Furthermore, when coating is circulated, bubble is easy to occur in coating, and curtain of coating breaks off, so that there is danger that a portion where coating is insufficient occurs. In addition, debris of building board tends to be contaminated, and the side wall of coating storage is clogged with the debris, so that there is danger that a portion where coating is insufficient occurs.

SUMMARY OF THE INVENTION

The present invention has been developed in view of the above-mentioned and/or other problems in the related art. The present invention can significantly improve upon existing methods.

The present invention can provide coating method of building board having convexoconcave in surface, and it coats for the whole surface of the building board and the whole edge of the building board enough while transporting the building board.

For achieving an above object, the present invention is coating method of building board having convexoconcave in surface coats for the whole surface of the building board and the whole edge of the building board enough while transporting the building board, and comprises the processes of:

the first process that coating is supplied and stocked in a tank installed above on a transportation line which transports the building board with making surface of the building board into the upper position; and the second process which the building board is passed under the tank, and coating is flowed down like waterfall by weight of the coating from a drain hole which is installed in the lower end of the tank, and it coats the whole surface and the whole edge of building board with coating enough, wherein width of the drain hole in vertical direction to travelling direction of the building board is wider than width of the building board in vertical direction to travelling direction, and amount of coating to the surface of the building board is 1200-1800 g/m².

In the present invention, amount of coating to surface of the building board is much with 1200-1800 g/m², so that it can coat the whole surface of the building board with coating, and coating overflows in vertical direction to travelling direction, the coating reaches one part of rear face of the building board via edge, and it can coat coating to the whole edge enough. In other words, it can coat coating for the whole surface of the building board and the whole edge of the building board enough, and there is no danger that a portion where coating is insufficient occurs on the surface and the edge.

In addition, when coating is circulated, amount of coating is much, so that it is hard to be affected by a occurring bubble, and there is no danger that coating breaks off.

Furthermore, coating is flowed down like waterfall by weight of the coating, so that it is hard to be affected by contaminating debris of the building board and viscosity of coating to use.

Therefore, an effect that degrees of freedom of usable coating rises and an effect to hold an energy cost in cheaply works.

In addition, the present invention is coating method that coating is flowed down like waterfall by weight of the coating from the drain hole having slit width of 3-6 mm.

In the present invention, slit width of the drain hole is 3-6 mm, so that it can make amount of coating to the surface of the building board to be 1200-1800 g/m², and it can control capacity of tank and amount of stocking coating in the tank. When slit width of the drain hole is made smaller than 3 mm, amount of coating flowed down like waterfall from the drain hole is little, and it is difficult to make amount of coating to surface of the building board with 1200-1800 g/m². When slit width of the drain hole is made wider than 6 mm, amount per hour of coating flowed down like waterfall from the drain hole is enormous, and capacity of tank becomes enormous, too.

Furthermore, the present invention is coating method that a space between uppermost face in the surface of transported board and lowermost end portion of drain hole which the lower end of the tank is 20-100 mm.

In the present invention, the space between uppermost face in the surface of transported board and lowermost end portion of drain hole which the lower end of the tank is 20-100 mm, so that it can coat coating to the whole surface of the building board surely, and when the coating is applied in the surface of the building board, a bounce of coating can be controlled. When the space between uppermost face in the surface of transported board and lowermost end portion of drain hole which the lower end of the tank is made smaller than 20 mm, there is a danger that the drain hole touches surface of the board by bending of the board. When the drain hole touches surface of the board, it gets impossible to coat the board with coating and to occur trouble in coater and the board by damaging. When the space between uppermost face in the surface of transported board and lowermost end portion of drain hole which the lower end of the tank is made wider than 100 mm, it is impossible to coated coating to the whole surface of the board surely, and it occurs trouble such as harmful effect to adhesion of coating and/or pollution of circumference by bounce of coating.

Furthermore, when the building board has shiplap portion in edge, coating method of the present invention comprises the processes of:

the third process that flowing direction of a part of the coating flowed down like waterfall from the drain hole is changed by contacting with flowing direction change member installed under the drain hole, and the edge of building board is coated with coating.

The flowing direction change member can be used metal plate such as gal barium steel plate, gal Tait steel plate, aluminum steel plate, stainless steel sheet, alloy plated sheet steel, zinc-coated steel, copper sheet plate, or resin plate such as acryl resin plate, urethane resin plate, or rubber plate such as polybutadiene plate, butadiene acrylonitrile plate, chloroprene plate. In addition, the flowing direction change member is not limiting in size. But length of 50-150 mm is preferable, and width of 10-300 mm is preferable. As for the shape, there are a shape which bent one piece of plate in a transverse direction or a shape which bent one piece of plate to J character-shaped in cross section. Furthermore, the flowing direction change member is installed under the drain hole, a space with the edge of the building board in the nearest portion of 5-50 mm is preferable. When the space between the flowing direction change member and the edge of the building board in the nearest position is made smaller than 5 mm, there is a danger that the drain hole touches surface of the board by bending of the board. When the drain hole touches surface of the board, it gets impossible to coat the board with coating and to occur trouble in coater and the board by damaging. When the space between the flowing direction change member and the edge of the building board in the nearest position is made wider than 50 mm, an effect that provided flowing direction change member is not shown enough. In the present invention, flowing direction of a part of the coating which is flowed down like waterfall from the drain hole is changed by contacting with the flowing direction change member, so that it can coat coating to the whole edge having shiplap portion of the building board enough, and there is no danger that a portion where coating is insufficient occurs on the edge.

Furthermore, coating method of the present invention comprises the processes of:

the fourth process that it makes coating spread through the edge of building board by spraying air towards shiplap portion from the outside lower diagonal direction of the building board.

In the present invention, it makes coating spread through the edge of building board by spraying air towards shiplap portion from the outside lower diagonal direction of the building board, so that it can coat coating to the whole edge having shiplap portion of the building board enough, in particular, rear face of upper shiplap portion and the edge side face which are more lower than upper shiplap portion is coated with coating, and there is no danger that a portion where coating is insufficient occurs on the edge.

EFFECT OF THE INVENTION

The present invention can provide coating method of building board convexoconcave in surface, and it can coat for the whole surface of the building board and the whole edge of the building board enough while transporting the building board. In particular, when the building board has upper shiplap portion in edge, the coating method can coat rear face of upper shiplap portion and edge side face under upper shiplap portion with coating.

In addition, when coating is circulated, it is hard to be affected by a occurring bubble, and there is no danger that coating breaks off.

Furthermore, it is hard to be affected by contaminating debris of the building board and viscosity of coating to use.

Therefore, an effect that degrees of freedom of usable coating rises and an effect to hold an energy cost in cheaply works.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DESCRIPTION OF THE PREFERRED EMBODIMENTS

In the following paragraphs, some preferred embodiments of the invention will be described with reference to the attached drawings by way of example and not limitation. It should be understood based on this disclosure that various other modifications can be made by those in the art based on these illustrated embodiments.

Firstly example of arrangement performing the present invention is explained;

nextly coating method of the present invention with the use of the arrangement is explained.

Embodiment 1

Figure 1:
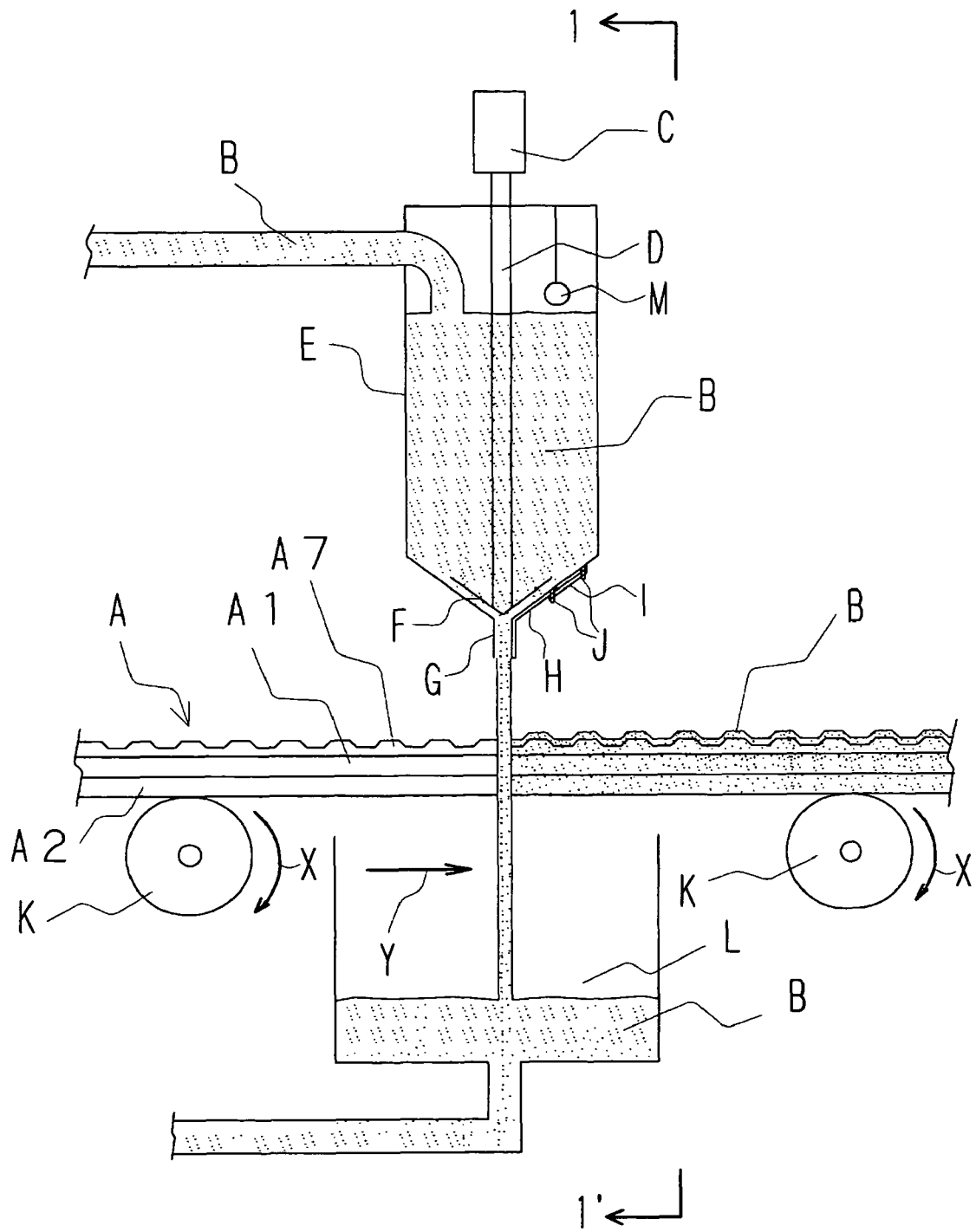
FIG. 1 is a lateral sectional view which showed an example of an arrangement performing coating method of the present invention.
Figure 2:
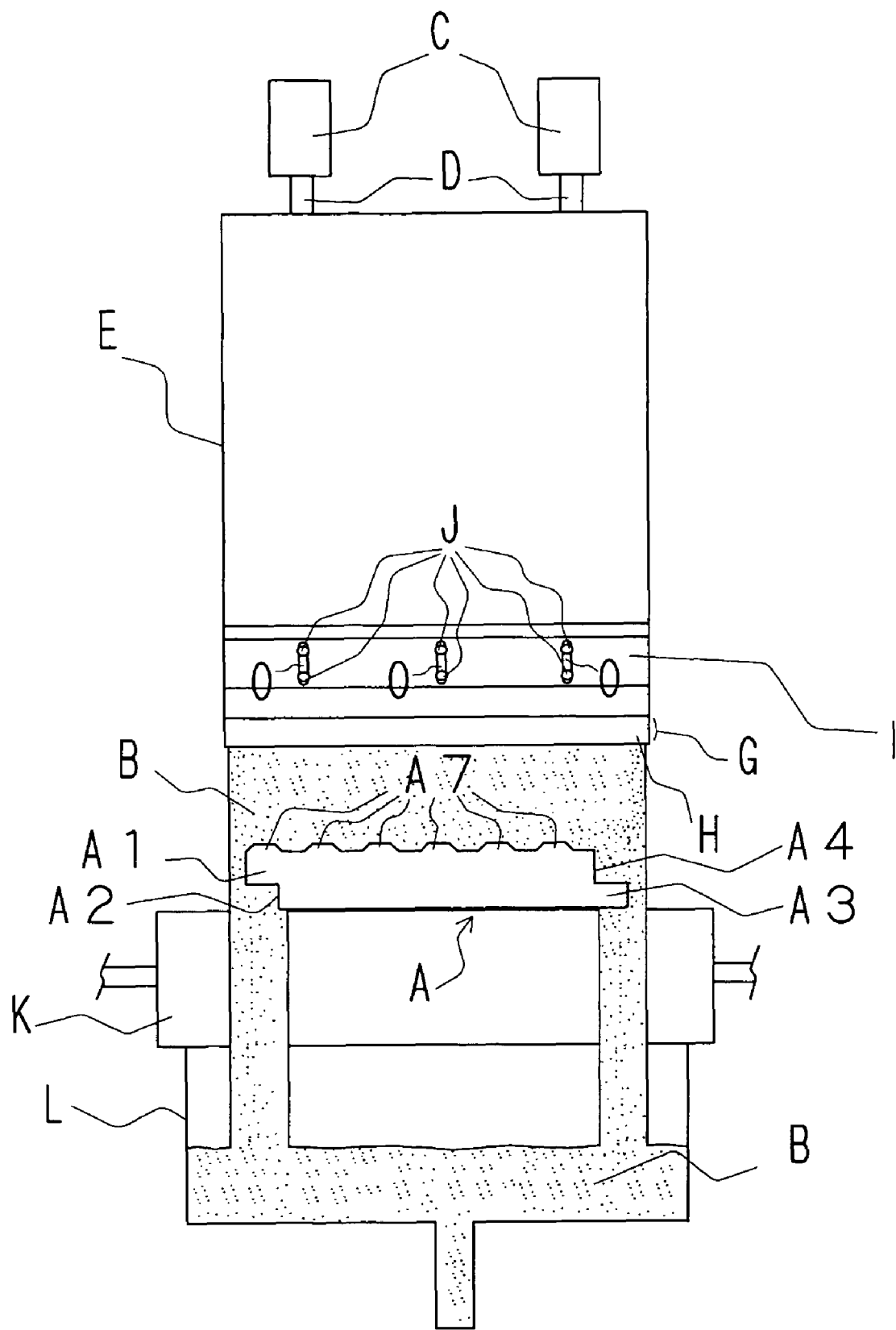
FIG. 2 is a front view which watched profile of 1-1' Line of an arrangement shown in FIG. 1 from travelling direction side.

FIG. 1 is a lateral sectional view which showed an example of an arrangement performing coating method of the present invention, and FIG. 2 is a front view which watched profile of 1-1' Line of an arrangement shown in FIG. 1 from travelling direction side.

Figure 15:
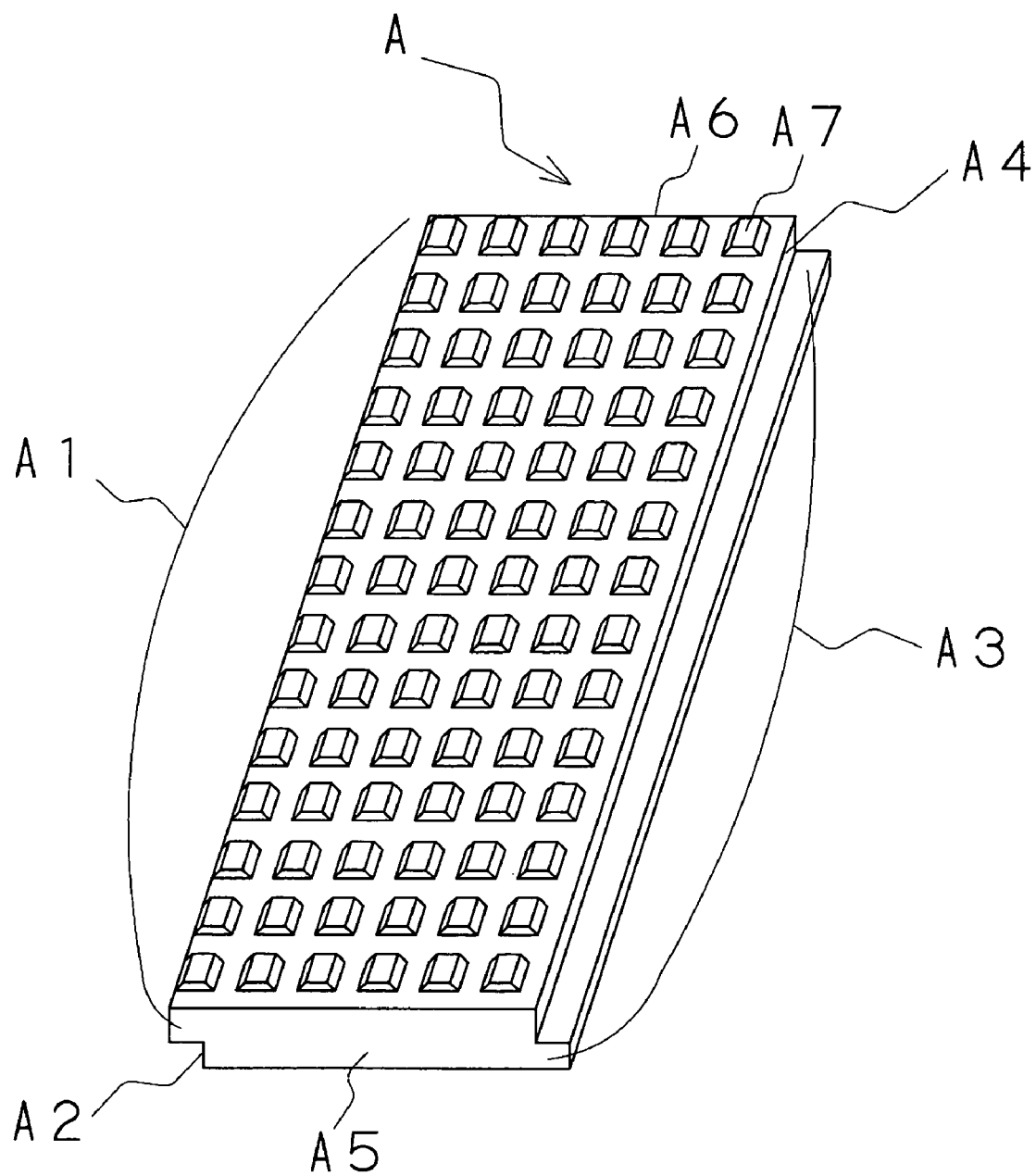
FIG. 15 is a view which showed an example of building board.

In an arrangement shown by FIG. 1 and FIG. 2, a building board A shown by FIG. 15 has convexoconcave in surface by a lot of convex portions A7, an edge having upper shiplap portion A1 and an edge having lower shiplap portion A3 is put on a transportation line with making surface of the building board A into the upper position, and building board A is transported to arrow Y-direction on the transportation line by turning transportation roller K to arrow X-direction. In addition, as for building board A, length is 3,030 mm, and width is 463 mm, and it is transported while making width of building board A in vertical direction to travelling direction into 463 mm.

A tank E which can stock coating B is installed above on the transportation line, and the coating B is supplied in tank E at any time. In addition, a control member M of stocked coating is installed in tank E. The control member M is sphere and has electrical signal, and it is usually hung by chain from ceiling of tank E. But when control member M floats by coating B, an electric information is sent from electrical signal, and supplying of coating B is stopped.

Drain hole G is installed in the lower end of tank E, and width of drain hole G in vertical direction to travelling direction of building board A is 520 mm, so that it is wider than width of building board A in vertical direction to travelling direction which is 463 mm. In addition, drain hole G is the structure which width of parallel side to travelling direction is adjusted to by flexed plate-shaped slit width adjustment member H and positioning member I. Specifically, slit width adjustment member H and positioning member I are fixed by bolt J, and slot O is installed in positioning member I. Position of slit width adjustment member H moves by changing fixed location of bolt J of positioning member I, and width of parallel side to travelling direction of drain hole G is adjusted to. In this arrangement, for making amount of coating B to surface of building board A with 1500 g/m², width of parallel side to travelling direction of drain hole G is 5 mm, and a space between uppermost face in the surface of transported building board A and lowermost end portion of drain hole G is 50 mm.

In addition, in an interior of tank E and the upper position of drain hole G, stopper F to cover and uncover drain hole G is installed, and stopper F connects with air cylinder C via connecting bar D. Stopper F can be moved up and down by making air cylinder C operate. And when building board A does not pass under tank E, stopper F contacts with bottommost intine of tank E, and drain hole G is blocked up, and coating B is not flowed down like waterfall from drain hole G.

Furthermore, under the transportation line, recovery tank L is installed, and extra coating B which was flowed down like waterfall from drain hole G and was not applied to building board A is collected in recovery tank L. Coating B collected in recovery tank L is pumped from recovery tank L to tank E, and it is recycled.

Next, coating method of the present invention with the use of the arrangement shown in FIG. 1 and FIG. 2 is explained.

At first, building board A is put on the transportation line with making surface of building board A into the upper position, and building board A is transported to arrow Y-direction on the transportation line by turning transportation roller K to arrow X-direction.

On the other hand, coating B is supplied in tank E which is installed above on the transportation line, and stocked in tank E.

Then subsequently, when building board A passes under tank E, stopper F moves up by making air cylinder C operate, and coating B is flowed down like waterfall by weight of the coating B from drain hole G for making amount of coating B to surface of building board A with 1500 g/m². In addition, width of drain hole G in vertical direction to travelling direction of building board A is 520 mm, and it is wider than width of the building board in vertical direction to travelling direction which is 463 mm, so that it can coat coating to the whole surface of building board A having convex portion A7 enough, and coating B overflows into vertical direction to travelling direction, the coating reaches one part of rear face of the building board via edge having shiplap portion, and it can coat coating to the whole surface of building board A and the whole edges of building board A comprising side face and rear face of upper shiplap portion A1, edge side face A2 under upper shiplap portion A1, surface and side face of lower shiplap portion A3, edge side face A4 above lower shiplap portion A3, edge side face A5 and edge side face A6 enough.

Furthermore, coating B collected in recovery tank L is pumped from recovery tank L to tank E, and it is recycled.

Embodiment 2

Furthermore, another example of an arrangement performing the present invention is shown.

Figure 3:
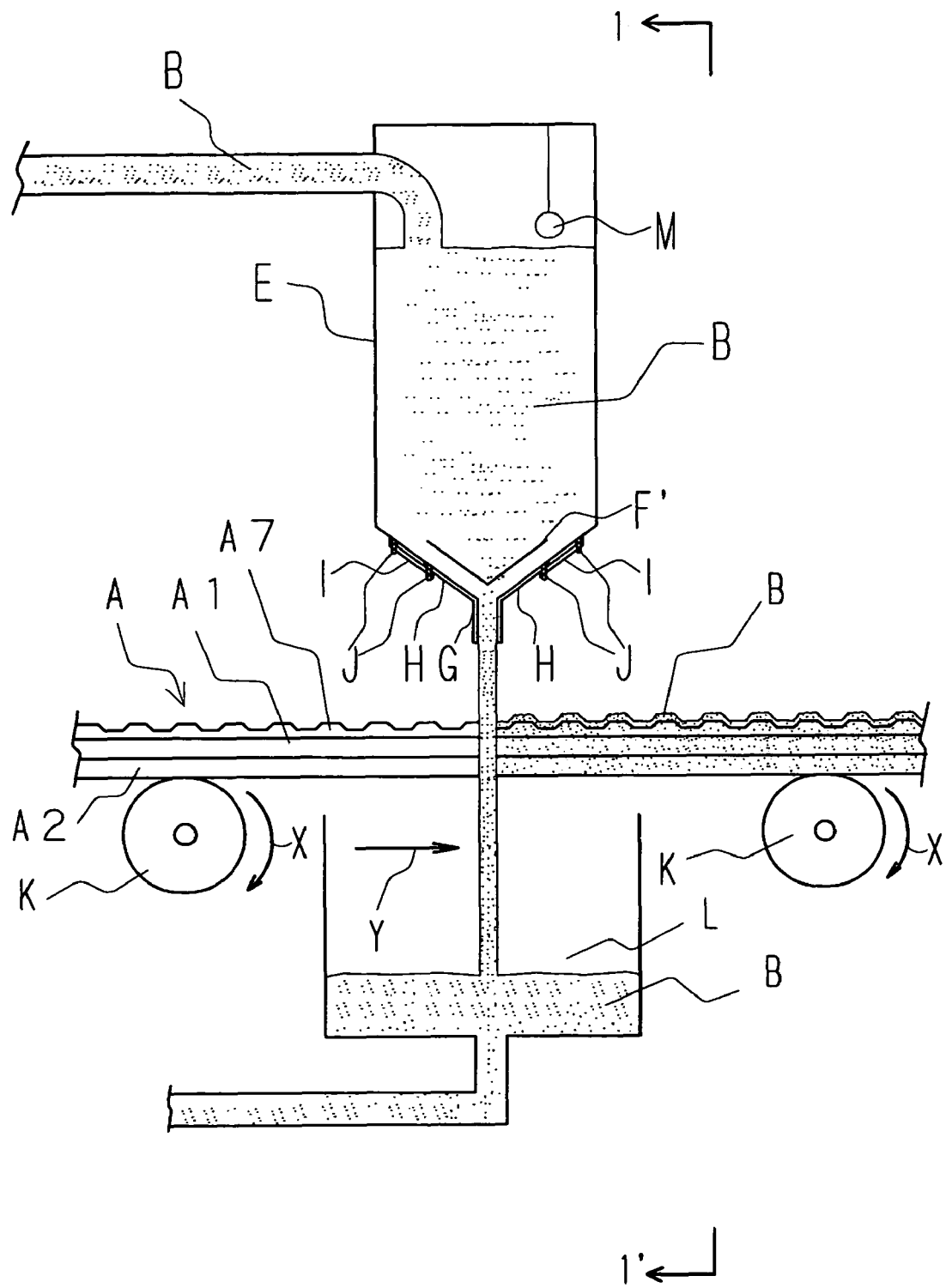
FIG. 3 is a lateral sectional view which showed other example of an arrangement performing coating method of the present invention.
Figure 4:
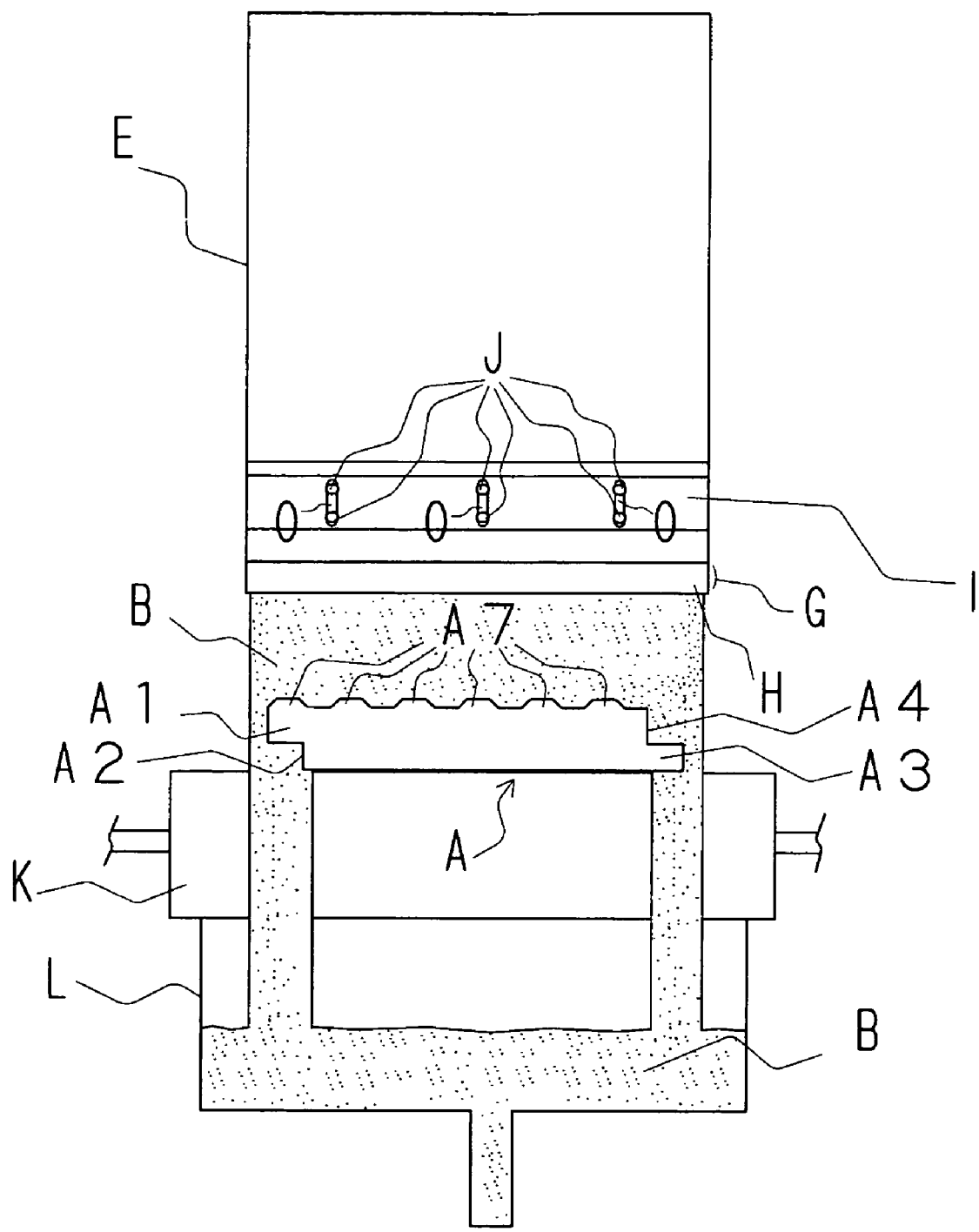
FIG. 4 is a front view which watched profile of 1-1' Line of an arrangement shown in FIG. 3 from travelling direction side.

FIG. 3 is a lateral sectional view which showed other example of an arrangement performing coating method of the present invention, and FIG. 4 is a front view which watched profile of 1-1' Line of an arrangement shown in FIG. 3 from travelling direction side.

In an arrangement shown by FIG. 3 and FIG. 4, constant amount of coating B is flowed down like waterfall by weight of the coating B from drain hole G, and it does not comprise connecting bar D and air cylinder C, and stopper F' is fixed in an interior of tank E and the upper position of drain hole G by having constant spacing, so that it is different from an arrangement shown by FIG. 1 and FIG. 2. In addition, slit width adjustment member H and positioning member I are installed in a couple on either side of drain hole G, so that width of drain hole G can be adjusted from opposite sides. Other is the same as an arrangement shown by FIG. 1 and FIG. 2, in this arrangement, for making amount of coating B to surface of building board A with 1500 g/m², width of parallel side to travelling direction of drain hole G is 5 mm, and a space between uppermost face in the surface of transported building board A and lowermost end portion of drain hole G is 50 mm.

Next, coating method of the present invention with the use of the arrangement shown in FIG. 3 and FIG. 4 is explained.

At first, building board A having convexoconcave in surface is put on the transportation line with making surface of building board A into the upper position, and building board A is transported to arrow Y-direction on the transportation line by turning transportation roller K to arrow X-direction.

On the other hand, coating B is supplied in tank E which is installed above on the transportation line, and stocked in tank E, and coating B is flowed down like waterfall by weight of the coating B from drain hole G.

Then subsequently, surface of building board A is coated with coating B bypassing building board A under tank E. Amount of coating B to surface of building board A is 1500 g/m$^2$, so that it can coat coating B to the whole surface of building board A having convex portion A7 and the whole edges of building board A comprising side face and rear face of upper shiplap portion A1, edge side face A2 under upper shiplap portion A1, surface and side face of lower shiplap portion A3, edge side face A4 above lower shiplap portion A3, edge side face A5 and edge side face A6 enough.

Furthermore, coating B collected in recovery tank L is pumped from recovery tank L to tank E, and it is recycled, so that it should not be useless.

Embodiment 3

Furthermore, other example of an arrangement performing the present invention is shown.

Figure 5:
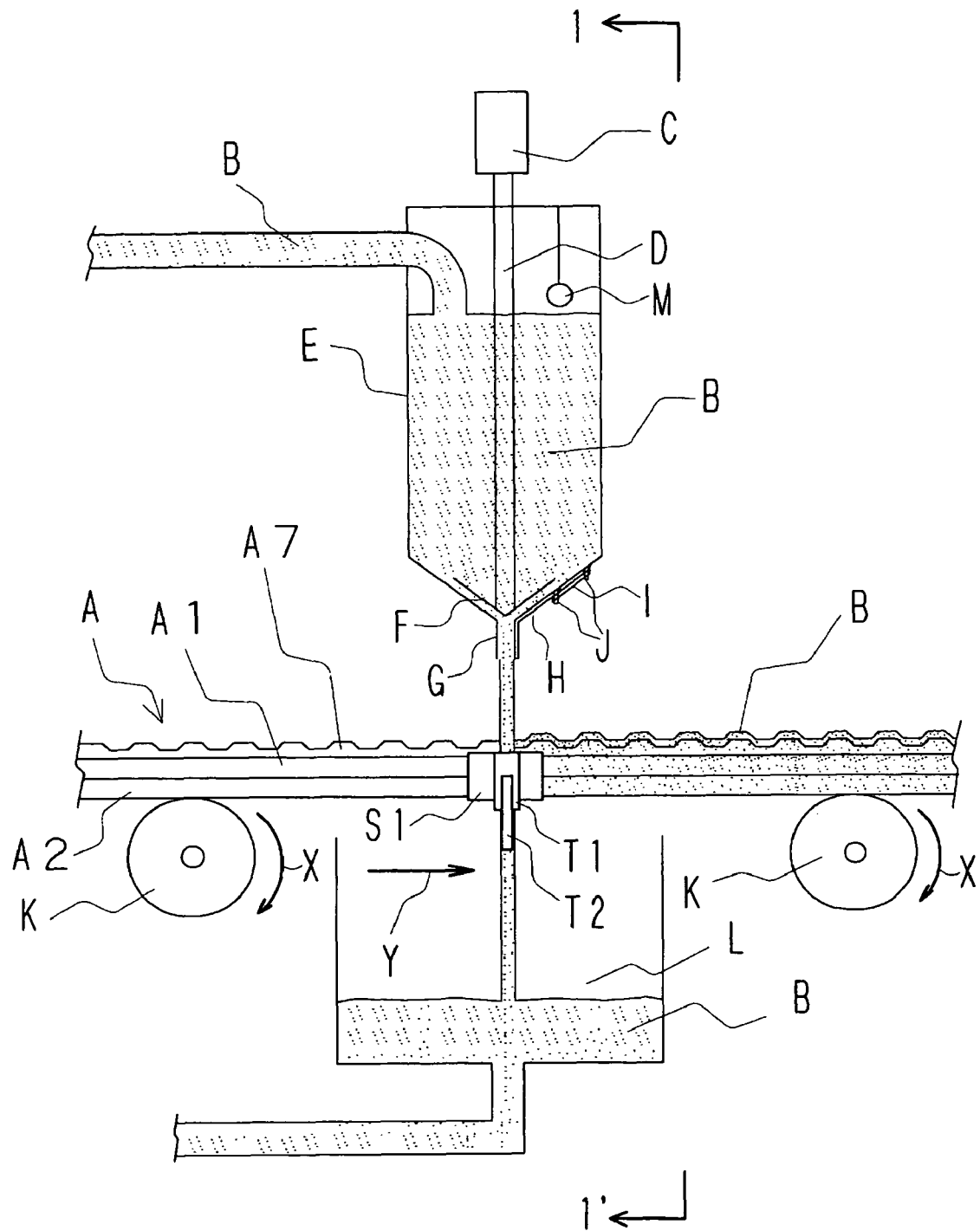
FIG. 5 is a lateral sectional view which showed other example of an arrangement performing coating method of the present invention.
Figure 6:
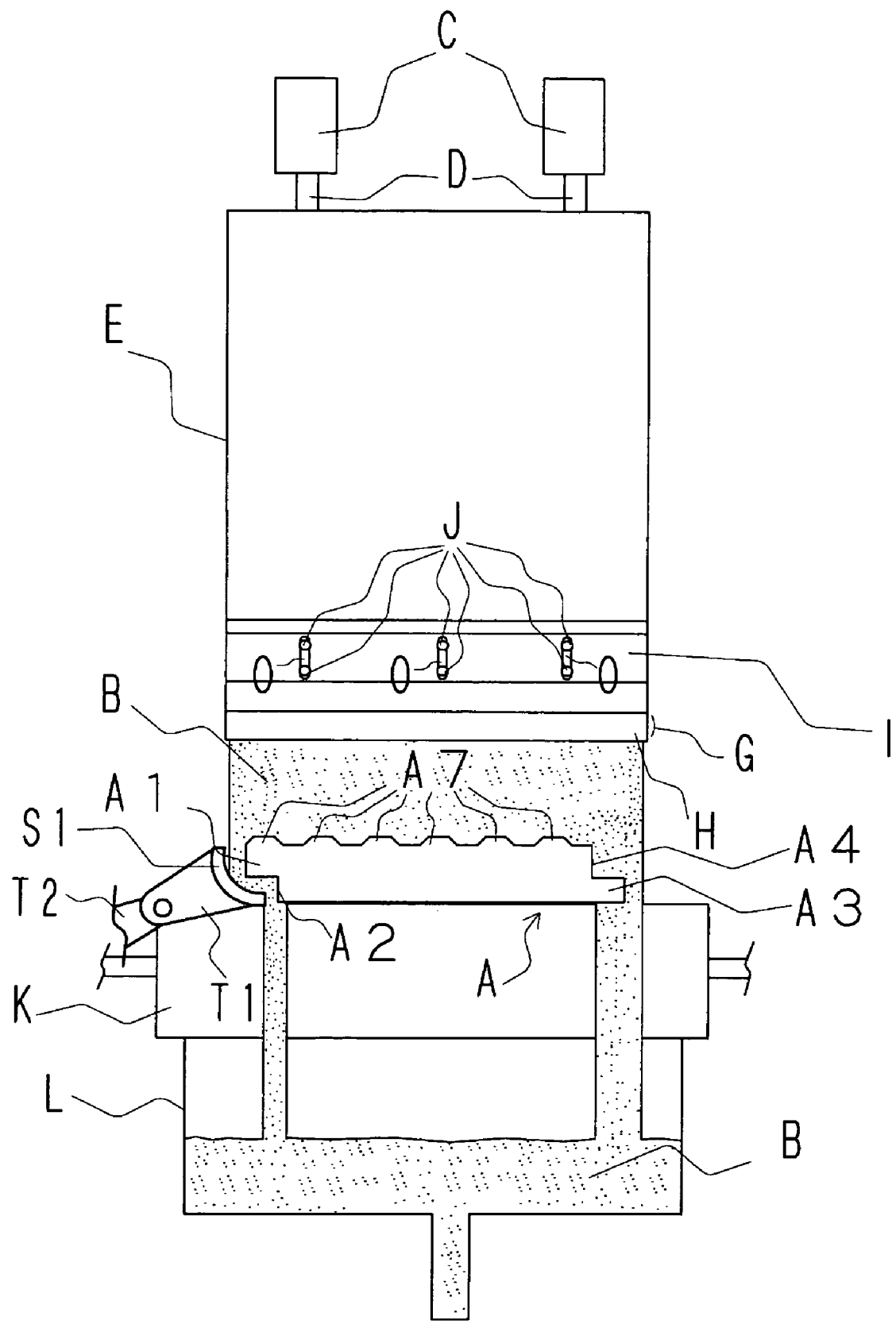
FIG. 6 is a front view which watched profile of 1-1' Line of an arrangement shown in FIG. 5 from travelling direction side.

FIG. 5 is a lateral sectional view which showed other example of an arrangement performing coating method of the present invention, and FIG. 6 is a front view which watched profile of 1-1' Line of an arrangement shown in FIG. 5 from travelling direction side.

The arrangement shown by FIG. 5 and FIG. 6 add flowing direction change member to arrangement shown by FIG. 1 and FIG. 2, the flowing direction change member comprises flowing direction change plate S1, positioning member T1 of flowing direction change plate and fixing member T2 of flowing direction change plate. Flowing direction change plate S1 and positioning member T1 are welded, and it is unified, and fixing member T2 is fixed not to move. Flowing direction change plate S1 is a shape which bent one piece of gal Tait steel plate to J character-shaped in cross section. Positioning member T1 is connected with fixing member T2 by a pin, and positioning member T1 is able to move by the pin as shaft, so that position of flowing direction change plate S1 is able to adjust by moving positioning member T1. In this arrangement, position of flowing direction change plate S1 is adjusted as the generally same height as a transportation position of building board A, and a space between upper shiplap portion A1 of transported building board A and position of flowing direction change plate S1 is adjusted as more than 10 mm.

Other is the same as an arrangement shown by FIG. 1 and FIG. 2, in this arrangement, for making amount of coating B to surface of building board A with 1500 g/m$^2$, width of drain hole G in vertical direction to travelling direction of building board A is 520 mm, and width of parallel side to travelling direction of drain hole G is 5 mm, and a space between uppermost face in the surface of transported building board A and lowermost end portion of drain hole G is 50 mm.

Next, coating method of the present invention with the use of the arrangement shown in FIG. 5 and FIG. 6 is explained.

At first, building board A is put on the transportation line with making surface of building board A into the upper position, and building board A is transported to arrow Y-direction on the transportation line by turning transportation roller K to arrow X-direction. On the other hand, coating B is supplied in tank E which is installed above on the transportation line, and stocked in tank E. Then subsequently, when building board A passes under tank E, stopper F moves up by making air cylinder C operate, and coating B is flowed down like waterfall by weight of the coating B from drain hole G for making amount of coating B to surface of building board A with 1500 g/m$^2$. The above is the same as coating method with the use of an arrangement shown in FIG. 1 and FIG. 2.

Then subsequently, flowing direction of one part of coating B which is flowed down like waterfall by weight of the coating B from drain hole G is changed by contacting with flowing direction change plate S1, and it coats side face and rear face of upper shiplap portion A1 of building board A and edge side face A2 under upper shiplap portion A1 of building board A. By contacting one part of coating B with flowing direction change plate S1, the whole edge of building board A having upper shiplap portion A1 and edge side face A2 is coated with coating B of an enough amount surely, it can be coated the whole edge of building board A with coating B enough than coating method with the use of an arrangement shown in FIG. 1 and FIG. 2, and there is no portion where coating is insufficient in the whole edge of building board A. In addition, it can coat coating B to the whole surface of building board A having convex portion A7 and the whole edges of building board A comprising side face and rear face of upper shiplap portion A1, edge side face A2 under upper shiplap portion A1, surface and side face of lower shiplap portion A3, edge side face A4 above lower shiplap portion A3, edge side face A5 and edge side face A6 enough.

Furthermore, coating B collected in recovery tank L is pumped from recovery tank L to tank E, and it is recycled.

Embodiment 4

Furthermore, other example of an arrangement performing the present invention is shown.

Figure 7:
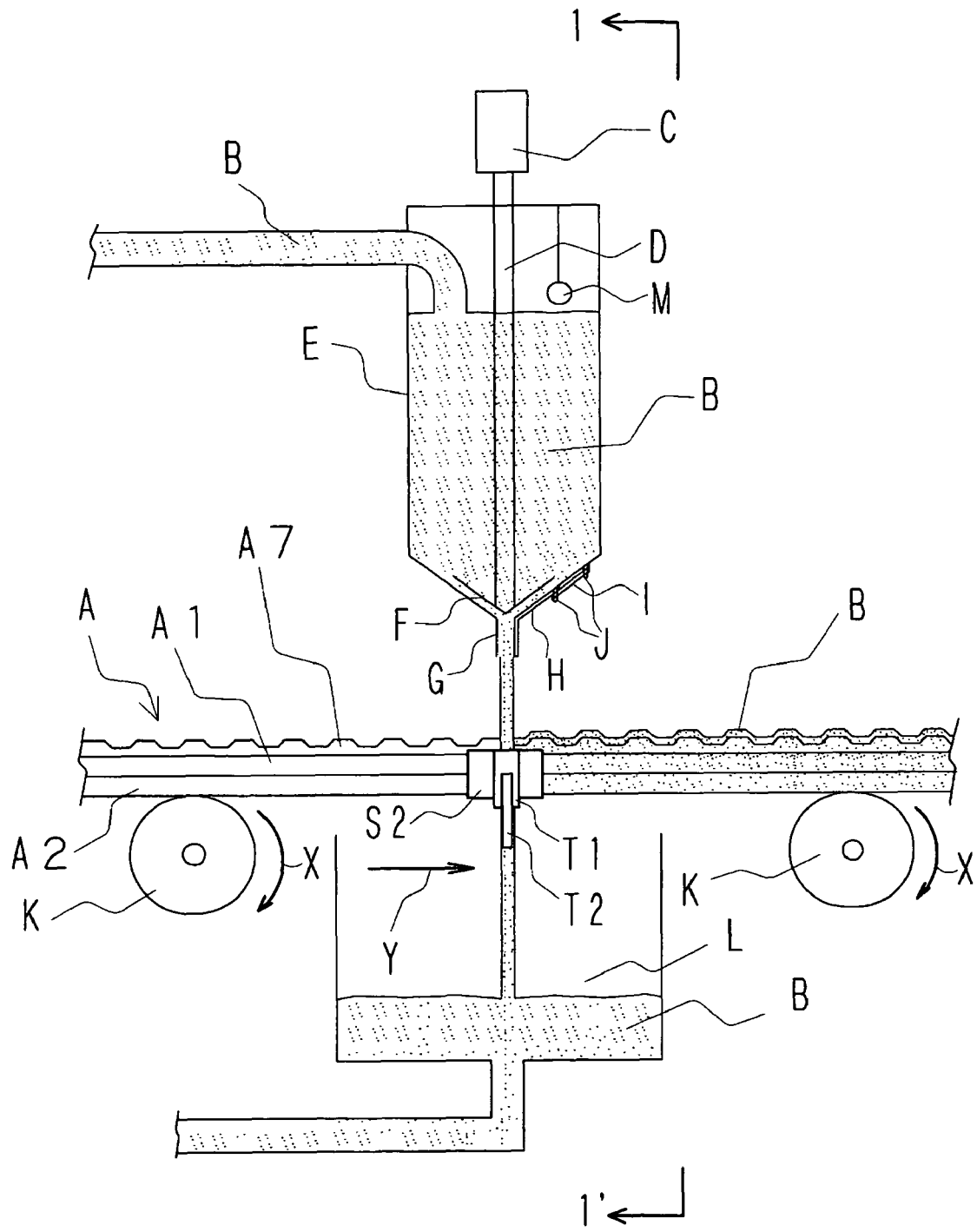
FIG. 7 is a lateral sectional view which showed other example of an arrangement performing coating method of the present invention.
Figure 8:
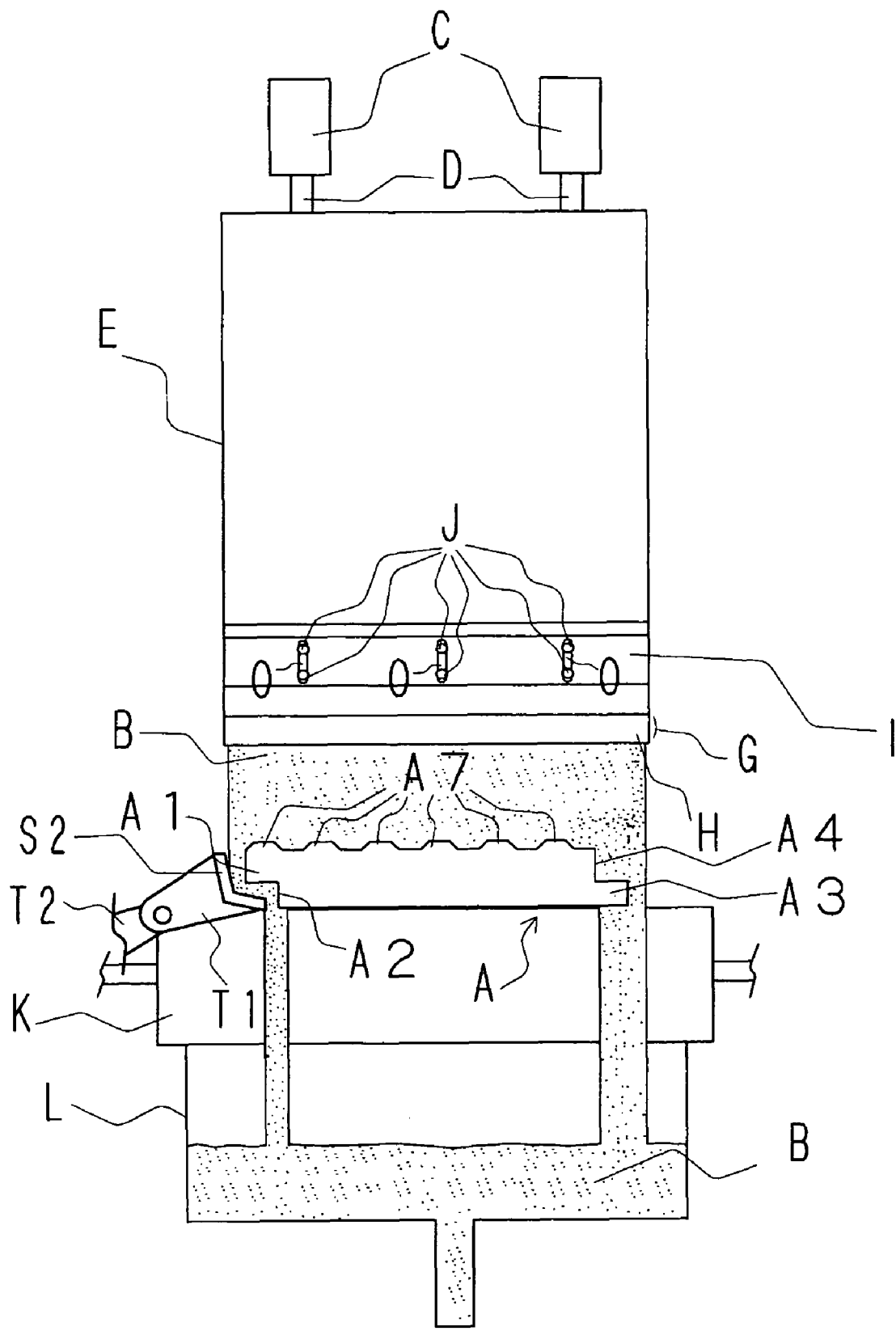
FIG. 8 is a front view which watched profile of 1-1' Line of an arrangement shown in FIG. 7 from travelling direction side.

FIG. 7 is a lateral sectional view which showed other example of an arrangement performing coating method of the present invention, and FIG. 8 is a front view which watched profile of 1-1' Line of an arrangement shown in FIG. 7 from travelling direction side.

The arrangement shown by FIG. 7 and FIG. 8 is changed from arrangement shown by FIG. 5 and FIG. 6, flowing direction change plate S1 of an arrangement shown by FIG. 5 and FIG. 6 is exchanged with flowing direction change plate S2, and other is the same as an arrangement shown by FIG. 5 and FIG. 6. Flowing direction change plate S2 is bent one piece of gal Tait steel plate in a transverse direction, and shape of flowing direction change plate S2 is different from shape of flowing direction change plate S1. Flowing direction change plate S2 and positioning member T1 are welded, and it is unified, and fixing member T2 is fixed not to move. Positioning member T1 is connected with fixing member T2 by a pin, and positioning member T1 is able to move by the pin as shaft, so that position of flowing direction change plate S2 is able to adjust by moving positioning member T1. In this arrangement, position of flowing direction change plate S2 is adjusted as the generally same height as a transportation position of building board A, and a space between upper shiplap portion A1 of transported building board A and position of flowing direction change plate S2 is adjusted as more than 10 mm.

In this arrangement, for making amount of coating B to surface of building board A with 1500 g/m$^2$, width of drain hole G in vertical direction to travelling direction of building board A is 520 mm, and width of parallel side to travelling direction of drain hole G is 5 mm, and a space between uppermost face in the surface of transported building board A and lowermost end portion of drain hole G is 50 mm.

Next, coating method of the present invention with the use of the arrangement shown in FIG. 7 and FIG. 8 is explained.

The arrangement shown by FIG. 7 and FIG. 8 is changed from arrangement shown by FIG. 5 and FIG. 6, flowing direction change plate S1 of an arrangement shown by FIG. 5 and FIG. 6 is exchanged with flowing direction change plate S2, and other is the same as an arrangement shown by FIG. 5 and FIG. 6. Therefore, coating method with the use of an arrangement shown in FIG. 7 and FIG. 8 is the same as coating method with the use of an arrangement shown in FIG. 5 and FIG. 6.

In this arrangement, flowing direction of one part of coating B which is flowed down like waterfall by weight of the coating B from drain hole G is changed by contacting with flowing direction change plate S2, and it coats side face and rear face of upper shiplap portion A1 of building board A and edge side face A2 under upper shiplap portion A1 of building board A. By contacting one part of coating B with flowing direction change plate S2, the whole edge of building board A having upper shiplap portion A1 and edge side face A2 is coated with coating B of an enough amount surely, it can be coated the whole edge of building board A with coating B enough, and there is no portion where coating is insufficient in the whole edge of building board A. In addition, it can coat coating B to the whole surface of building board A having convex portion A7 and the whole edges of building board A comprising side face and rear face of upper shiplap portion A1, edge side face A2 under upper shiplap portion A1, surface and side face of lower shiplap portion A3, edge side face A4 above lower shiplap portion A3, edge side face A5 and edge side face A6 enough.

Embodiment 5

Furthermore, other example of an arrangement performing the present invention is shown.

Figure 9:
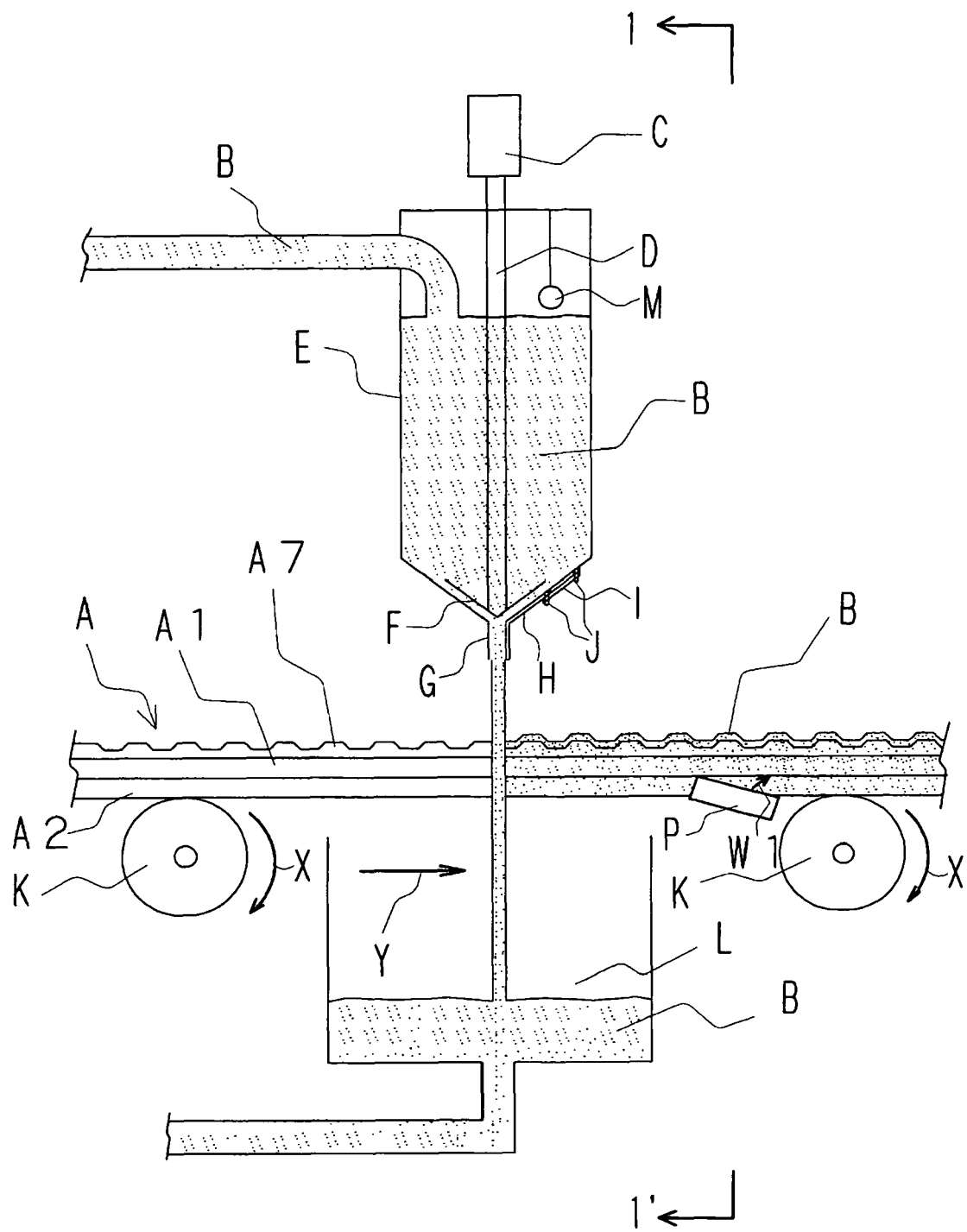
FIG. 9 is a lateral sectional view showed other example of an arrangement performing coating method of the present invention.
Figure 10:
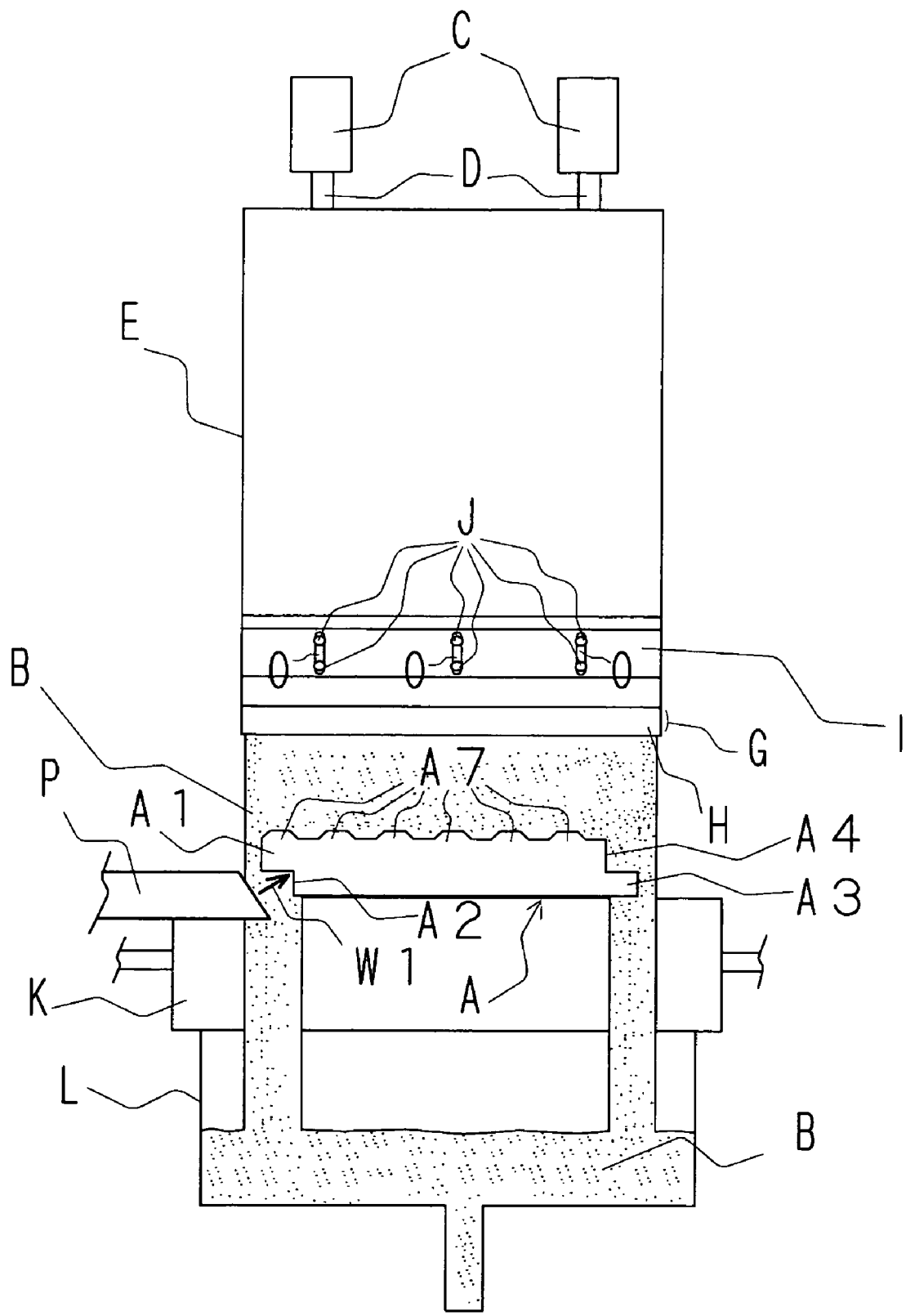
FIG. 10 is a front view which watched profile of 1-1' Line of an arrangement shown in FIG. 9 from travelling direction side.

FIG. 9 is a lateral sectional view which showed other example of an arrangement performing coating method of the present invention, and FIG. 10 is a front view which watched profile of 1-1' Line of an arrangement shown in FIG. 9 from travelling direction side.

The arrangement shown by FIG. 9 and FIG. 10 add air spray member P to arrangement shown by FIG. 1 and FIG. 2, and installed position of air spray member P is outside of building board A and the travelling direction side than drain hole G and lower than upper shiplap portion A1 of the building board A. Upper shiplap portion A1 of building board A is coated with coating B flowed down like waterfall by weight of the coating B, and air spray member P sprays upper shiplap portion A1 of building board A with air to arrow W1-direction (direction to upper shiplap portion from the outside lower diagonal direction of the building board A) immediately.

Other is the same as an arrangement shown by FIG. 1 and FIG. 2, in this arrangement, for making amount of coating B to surface of building board A with 1500 g/m$^2$, width of drain hole G in vertical direction to travelling direction of building board A is 520 mm, and width of parallel side to travelling direction of drain hole G is 5 mm, and a space between uppermost face in the surface of transported building board A and lowermost end portion of drain hole G is 50 mm.

Next, coating method of the present invention with the use of the arrangement shown in FIG. 9 and FIG. 10 is explained.

At first, building board A is put on the transportation line with making surface of building board A into the upper position, and building board A is transported to arrow Y-direction on the transportation line by turning transportation roller K to arrow X-direction. On the other hand, coating B is supplied in tank E which is installed above on the transportation line, and stocked in tank E. Then subsequently, when building board A passes under tank E, stopper F moves up by making air cylinder C operate, and coating B is flowed down like waterfall by weight of the coating B from drain hole G for making amount of coating B to surface of building board A with 1500 g/m$^2$. The above is the same as coating method with the use of an arrangement shown in FIG. 1 and FIG. 2.

Then subsequently, upper shiplap portion A1 of building board A is coated with coating B flowed down like waterfall by weight of coating B, and air spray member P sprays the upper shiplap portion A1 of building board A with air to arrow W1-direction (direction to upper shiplap portion from the outside lower diagonal direction of the building board A) immediately. Air spray member P sprays the upper shiplap portion A1 of building board A with air, so that coating B is spread through rear face of upper shiplap portion A1 and edge side face A2 under upper shiplap portion A1, and the depth of upper shiplap portion A1 is coated with coating B, and there is no danger that a portion where coating B is insufficient occurs on the edge having shiplap portion. In addition, it can coat coating B to the whole surface of building board A having convex portion A7 and the whole edges of building board A comprising side face and rear face of upper shiplap portion A1, edge side face A2 under upper shiplap portion A1, surface and side face of lower shiplap portion A3, edge side face A4 above lower shiplap portion A3, edge side face A5 and edge side face A6 enough.

Embodiment 6

Furthermore, other example of an arrangement performing the present invention is shown.

Figure 11:
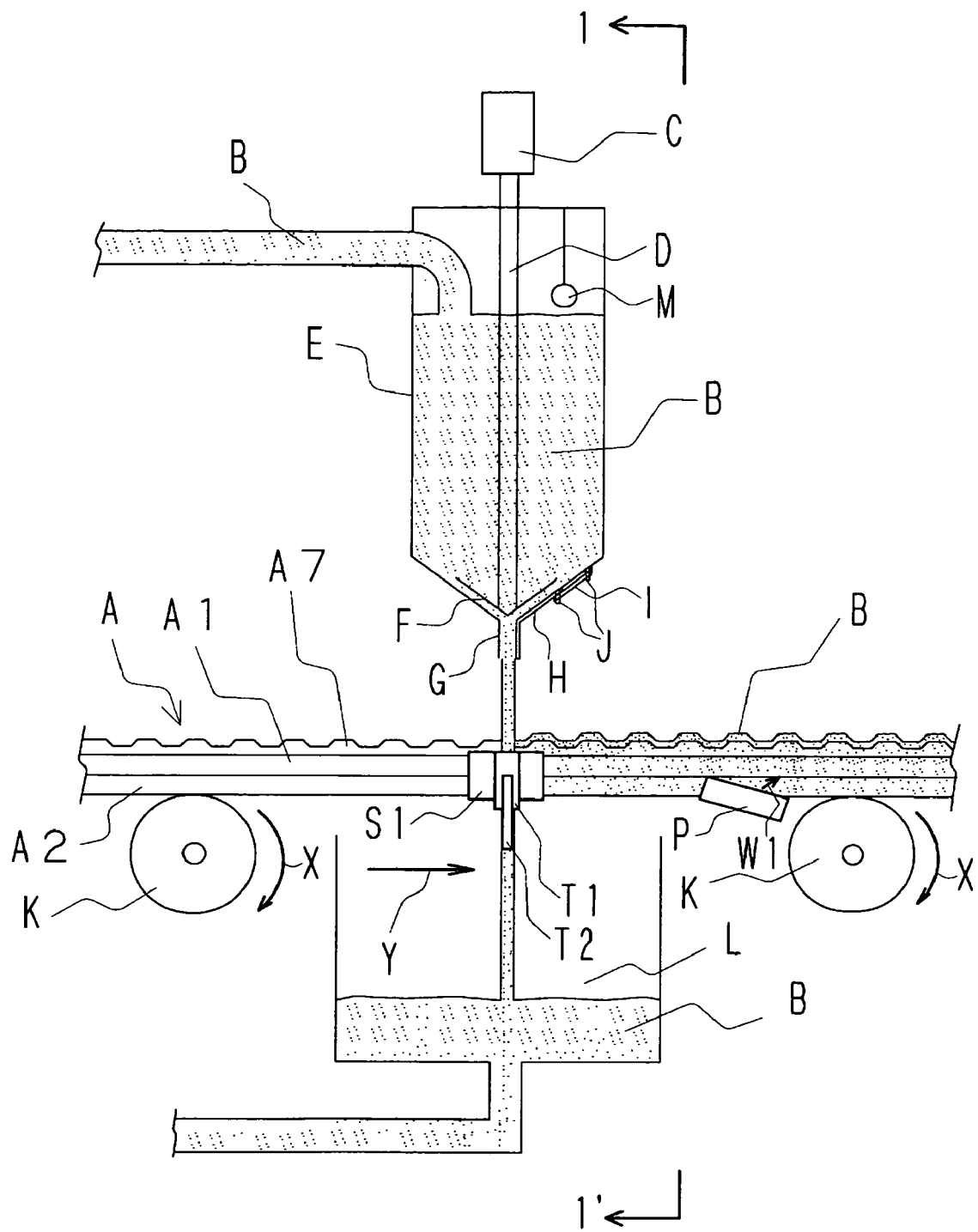
FIG. 11 is a lateral sectional view showed other example of an arrangement performing coating method of the present invention.
Figure 12:
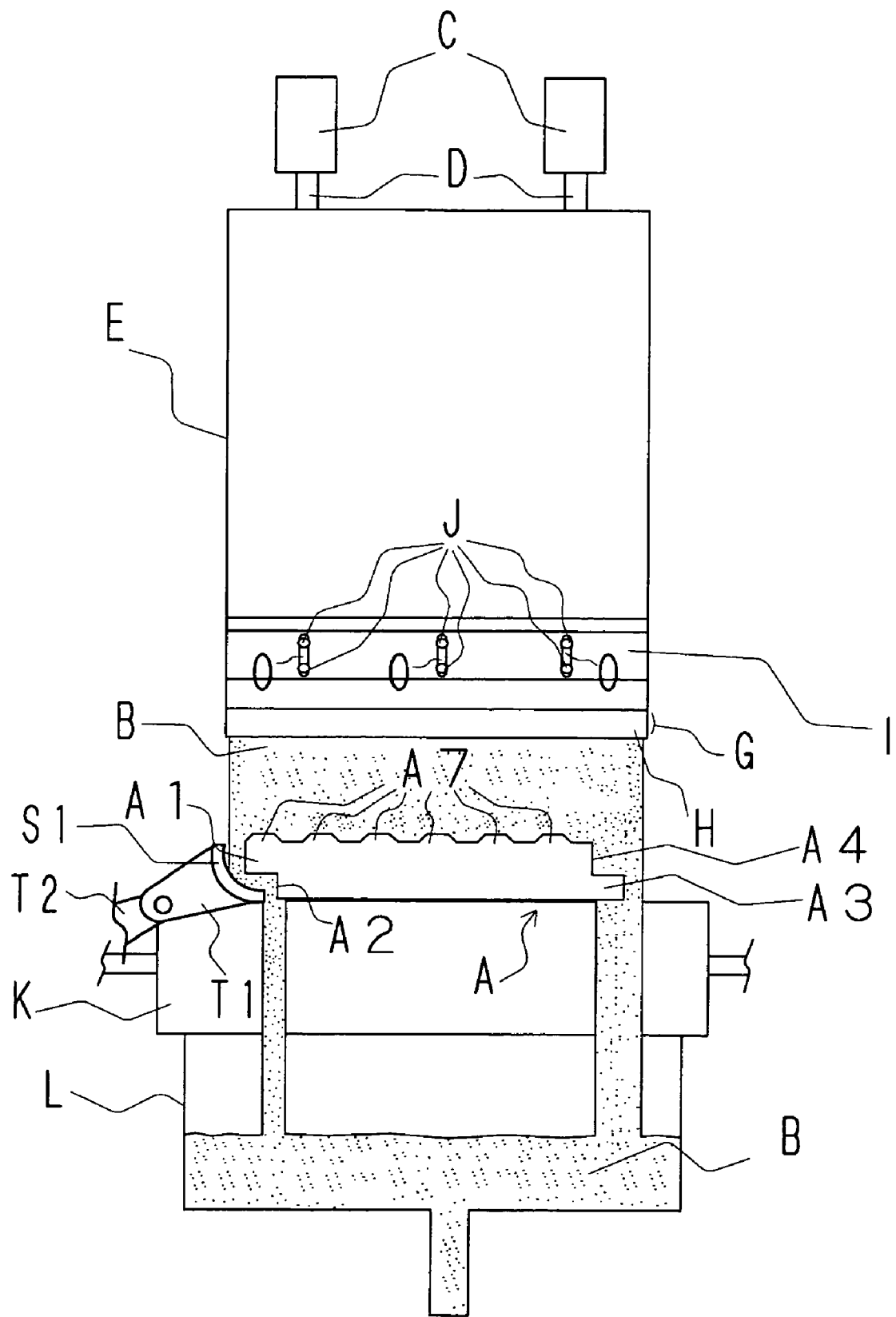
FIG. 12 is a front view which watched profile of 1-1' Line of an arrangement shown in FIG. 11 from travelling direction side.

FIG. 11 is a lateral sectional view which showed other example of an arrangement performing coating method of the present invention, and FIG. 12 is a front view which watched profile of 1-1' Line of an arrangement shown in FIG. 11 from travelling direction side.

The arrangement shown by FIG. 11 and FIG. 12 add air spray member P to arrangement shown by FIG. 5 and FIG. 6, and installed position of air spray member P is outside of building board A and the travelling direction side than drain hole G and lower than upper shiplap portion A1 of the building board A. Upper shiplap portion A1 of building board A is coated with coating B flowed down like waterfall by weight of the coating B, and air spray member P sprays the upper shiplap portion A1 of building board A with air to arrow W1-direction (direction to upper shiplap portion from the outside lower diagonal direction of the building board A) immediately.

Other is the same as an arrangement shown by FIG. 5 and FIG. 6, in this arrangement, for making amount of coating B to surface of building board A with 1500 g/m$^2$, width of drain hole G in vertical direction to travelling direction of building board A is 520 mm, and width of parallel side to travelling direction of drain hole G is 5 mm, and a space between uppermost face in the surface of transported building board A and lowermost end portion of drain hole G is 50 mm. And position of flowing direction change plate S1 is adjusted as the generally same height as a transportation position of building board A, and a space between upper shiplap portion A1 of transported building board A and position of flowing direction change plate S1 is adjusted as more than 10 mm.

Next, coating method of the present invention with the use of the arrangement shown in FIG. 11 and FIG. 12 is explained. At first, building board A is put on the transportation line with making surface of building board A into the upper position, and building board A is transported to arrow Y-direction on the transportation line by turning transportation roller K to arrow X-direction. On the other hand, coating B is supplied in tank E which is installed above on the transportation line, and stocked in tank E. Then subsequently, when building board A passes under tank E, stopper F moves up by making air cylinder C operate, and coating B is flowed down like waterfall by weight of the coating B from drain hole G for making amount of coating B to surface of building board A with 1500 g/m². Then, flowing direction of one part of coating B which is flowed down like waterfall by weight of the coating B from drain hole G is changed by contacting with flowing direction change plate S1, and it coats side face and rear face of upper shiplap portion A1 of building board A and edge side face A2 under upper shiplap portion A1 of building board A. The above is the same as coating method with the use of an arrangement shown in FIG. 5 and FIG. 6.

Then subsequently, air spray member P sprays the upper shiplap portion A1 of building board A with air to arrow W1-direction (direction to upper shiplap portion from the outside lower diagonal direction of the building board A) immediately. By contacting one part of coating B with flowing direction change plate S1, the whole edge of building board A having upper shiplap portion A1 is coated with coating B of an enough amount surely, and air spray member P sprays the upper shiplap portion A1 of building board A and edge side face A2 of building board A with air, so that coating B is spread through rear face of upper shiplap portion A1 and edge side face A2 under upper shiplap portion A1, and the depth of upper shiplap portion A1 is coated with coating B, and there is no danger that a portion where coating B is insufficient occurs on the edge having shiplap portion. In addition, it can coat coating B to the whole surface of building board A having convex portion A7 and the whole edges of building board A comprising side face and rear face of upper shiplap portion A1, edge side face A2 under upper shiplap portion A1, surface and side face of lower shiplap portion A3, edge side face A4 above lower shiplap portion A3, edge side face A5 and edge side face A6 enough.

Furthermore, coating B collected in recovery tank L is pumped from recovery tank L to tank E, and it is recycled.

Embodiment 7

Furthermore, other example of an arrangement performing the present invention is shown.

Figure 13:
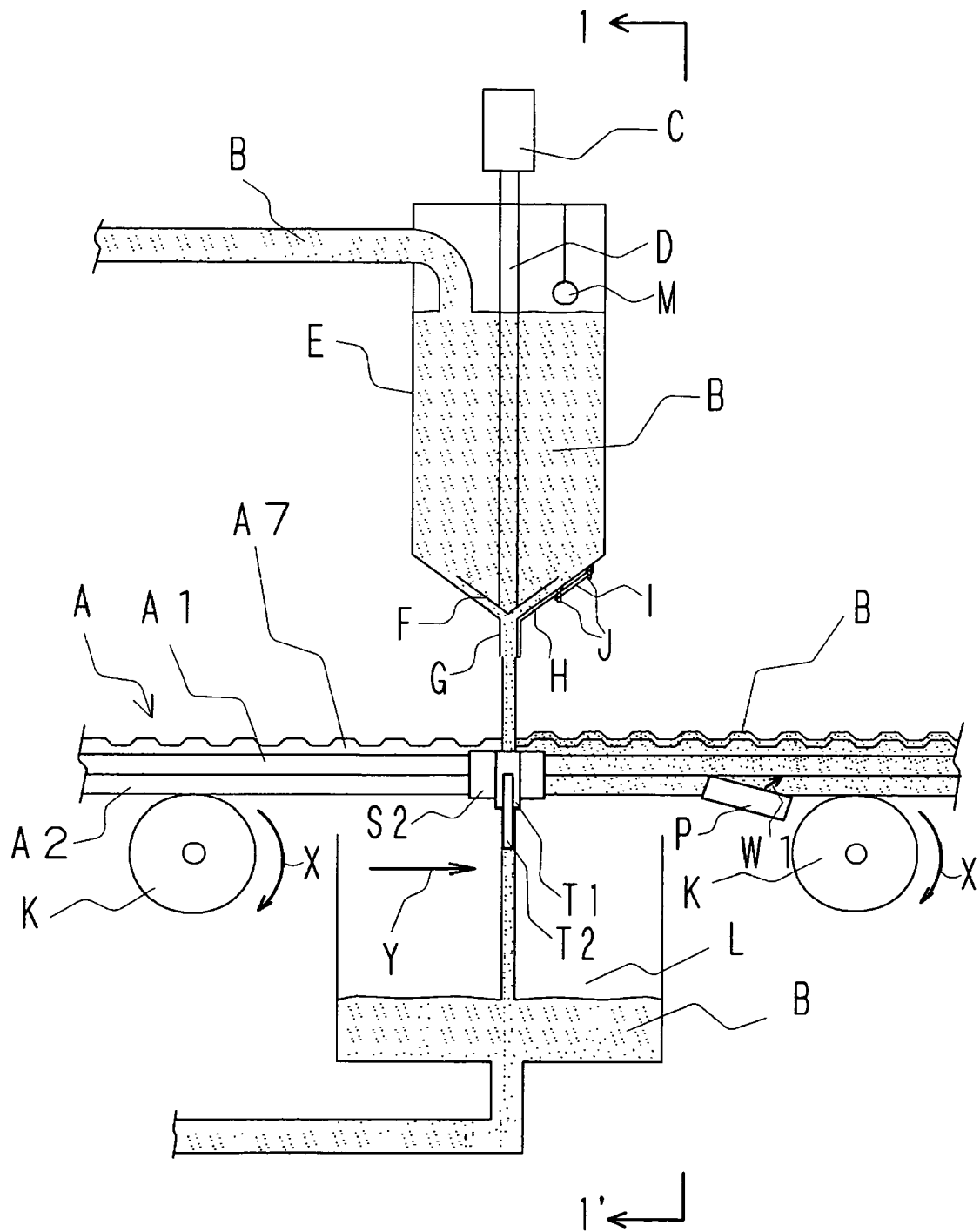
FIG. 13 is a lateral sectional view which showed other example of an arrangement performing coating method of the present invention.
Figure 14:
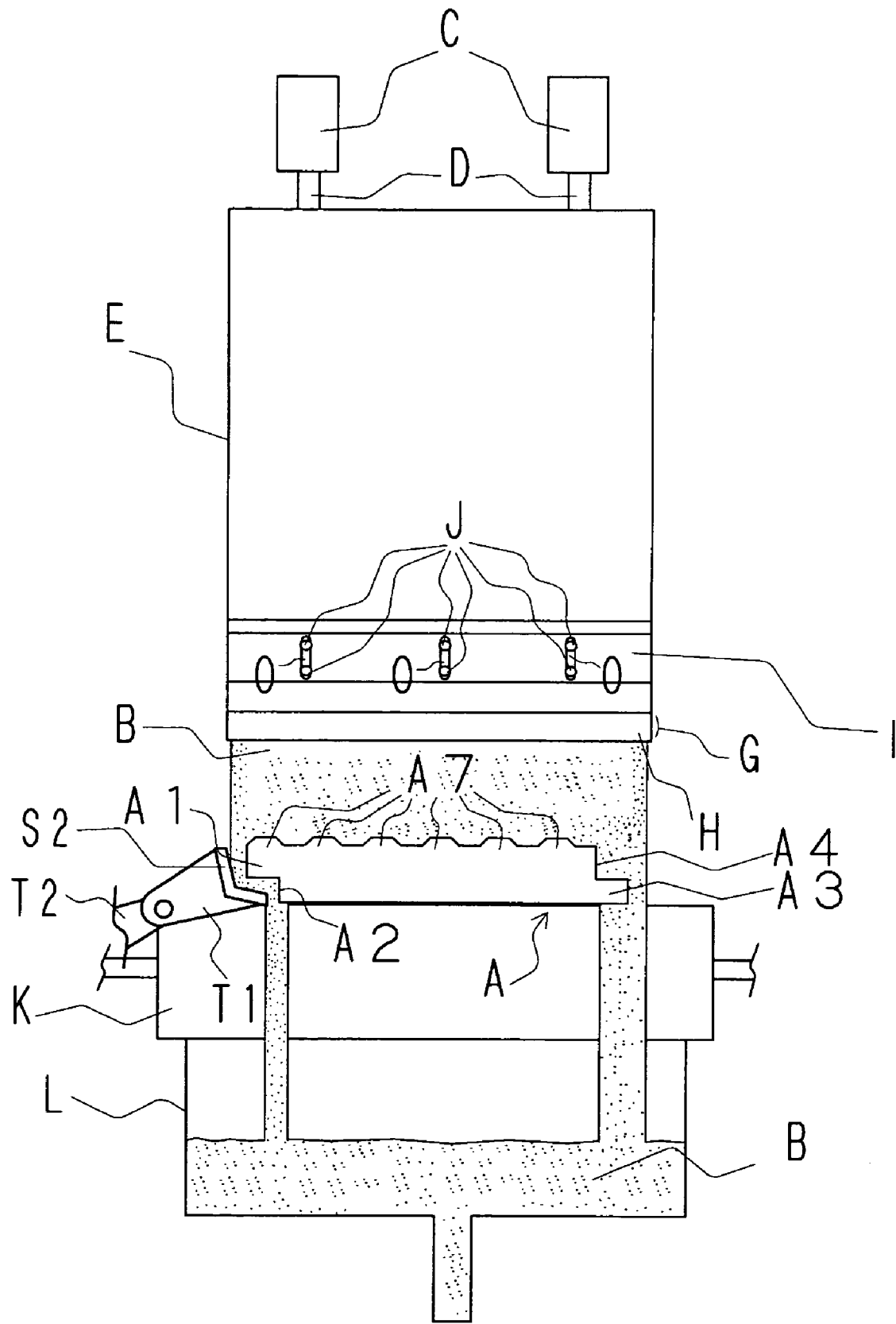
FIG. 14 is a front view which watched profile of 1-1' Line of an arrangement shown in FIG. 13 from travelling direction side.

FIG. 13 is a lateral sectional view which showed other example of an arrangement performing coating method of the present invention, and FIG. 14 is a front view which watched profile of 1-1' Line of an arrangement shown in FIG. 13 from travelling direction side.

The arrangement shown by FIG. 13 and FIG. 14 is changed from arrangement shown by FIG. 11 and FIG. 12, flowing direction change plate S1 of an arrangement shown by FIG. 11 and FIG. 12 is exchanged with flowing direction change plate S2, and other is the same as an arrangement shown by FIG. 11 and FIG. 12. Flowing direction change plate S2 is bent one piece of gal Tait steel plate in a transverse direction, and shape of flowing direction change plate S2 is different from shape of flowing direction change plate S1. Flowing direction change plate S2 and positioning member T1 are welded, and it is unified, and fixing member T2 is fixed not to move. Positioning member T1 is connected with fixing member T2 by a pin, and positioning member T1 is able to move by the pin as shaft, so that position of flowing direction change plate S2 is able to adjust by moving positioning member T1. In this arrangement, position of flowing direction change plate S2 is adjusted as the generally same height as a transportation position of building board A, and a space between upper shiplap portion A1 of transported building board A and position of flowing direction change plate S2 is adjusted as more than 10 mm. In this arrangement, for making amount of coating B to surface of building board A with 1500 g/m², width of drain hole G in vertical direction to travelling direction of building board A is 520 mm, and width of parallel side to travelling direction of drain hole G is 5 mm, and a space between uppermost face in the surface of transported building board A and lowermost end portion of drain hole G is 50 mm.

Next, coating method of the present invention with the use of the arrangement shown in FIG. 13 and FIG. 14 is explained. The arrangement shown by FIG. 13 and FIG. 14 is changed from arrangement shown by FIG. 11 and FIG. 12, flowing direction change plate S1 of an arrangement shown by FIG. 11 and FIG. 12 is exchanged with flowing direction change plate S2, and other is the same as an arrangement shown by FIG. 11 and FIG. 12. Flowing direction change plate S2 is bent one piece of gal Tait steel plate in a transverse direction, and shape of flowing direction change plate S2 is different from shape of flowing direction change plate S1. Therefore, coating method with the use of an arrangement shown in FIG. 13 and FIG. 14 is the same as coating method with the use of an arrangement shown in FIG. 11 and FIG. 12.

In the arrangement shown by FIG. 13 and FIG. 14, by contacting one part of coating B with flowing direction change plate S2, the whole edge of building board A having upper shiplap portion A1 is coated with coating B of an enough amount surely, and air spray member P sprays the upper shiplap portion A1 of building board A and edge side face A2 of building board A with air, so that coating B is spread through rear face of upper shiplap portion A1 and edge side face A2 under upper shiplap portion A1, and the depth of upper shiplap portion A1 is coated with coating B, and there is no danger that a portion where coating B is insufficient occurs on the edge having shiplap portion. In addition, it can coat coating B to the whole surface of building board A having convex portion A7 and the whole edges of building board A comprising side face and rear face of upper shiplap portion A1, edge side face A2 under upper shiplap portion A1, surface and side face of lower ship lap portion A3, edge side face A4 above lower shiplap portion A3, edge side face A5 and edge side face A6 enough.

Embodiment 8

Next, coating process of the present invention were compared with a conventional spraying method and a conventional curtain coater method by using fiber reinforced cement siding board having a brick design in surface. At first, fiber reinforced cement siding board which was coated with coating comprising acryl emulsion resin by each coating method were prepared respectively. Namely, fiber reinforced cement siding board which was coated with coating comprising acryl emulsion resin by coating process of the present invention shown by FIG. 1 and FIG. 2, fiber reinforced cement siding board which was coated with coating comprising acryl emulsion resin by a conventional spraying method and fiber reinforced cement siding board which was coated with coating comprising acryl emulsion resin by a conventional curtain coater method were prepared respectively.

Next, coating comprising another acryl emulsion resin was coated by same setting in the surface of each board, and it was dried, and each coating board was prepared.

And surface water absorption was measured about each coating board, it was compared.

In addition, the surface water absorption was measured by a method comprises the processes of:

the first process that frame of 0.2 square meter was put in surface of coating board and weight was measured; and the second process that water of constant amount was put in the frame and it was left for 24 hours; and the third process that water was drained from the frame and weight was measured.

The surface water absorption is the value that calculated weight alteration of coating board of measurement before and after by equation 1.

equation 1=(weight of coating board after 24 hours (gram)−initial weight of coating board (gram)) ÷area of frame (0.2×0.2: square meter)

In fiber reinforced cement siding board which was coated with coating by coating process of the present invention, when coating process of the present invention was applied to the fiber reinforced cement siding board, surface of the fiber reinforced cement siding board had no portion where the coating was insufficient. Therefore, surface of coating board had no portion where the coating was insufficient, and surface water absorption was 110 g/m².

In fiber reinforced cement siding board which was coated with coating by conventional spraying method, when the conventional spraying method was applied to the fiber reinforced cement siding board, surface of the fiber reinforced cement siding board had no portion where the coating was insufficient. But surface water absorption was 240 g/m², it was easy to absorb water in comparison with fiber reinforced cement siding board which was applied to coating process of the present invention.

In fiber reinforced cement siding board which was coated with coating by conventional curtain coater method, when the conventional curtain coater method was applied to the fiber reinforced cement siding board, surface of the fiber reinforced cement siding board had portion where the coating was insufficient, and surface water absorption was 2130 g/m², it was easy to absorb water in comparison with fiber reinforced cement siding board which was applied to coating process of the present invention. In addition, in edge, edge side face and rear face of shiplap portion had portion where the coating was insufficient.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.q., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

For example, it is able to control amount of coating B which is stocked in tank E without control member M of stocked coating by installing another drain hole which is different from drain hole G for adjusting amount of supplied coating B to tank E and amount of drained coating B from tank E. The another drain hole is installed in between supply port of coating and drain hole G. Amount of drained coating B from tank E by the another drain hole is more than amount of supplied coating B to tank E, so that coating B in tank E is not stocked more than constant amount. In addition, it is able to move stopper F by manual operation without connecting air cylinder C. In addition, it is able to adjust width of drain hole G by making slot in slit width adjustment member H and changing position of bolt J in slit width adjustment member H. In addition, it is able to install plural air spray member P, and it is able to spray air to reverse direction to travelling direction (direction to upper shiplap portion from the outside lower diagonal direction of the building board A) by air spray member P.

Figure 16:
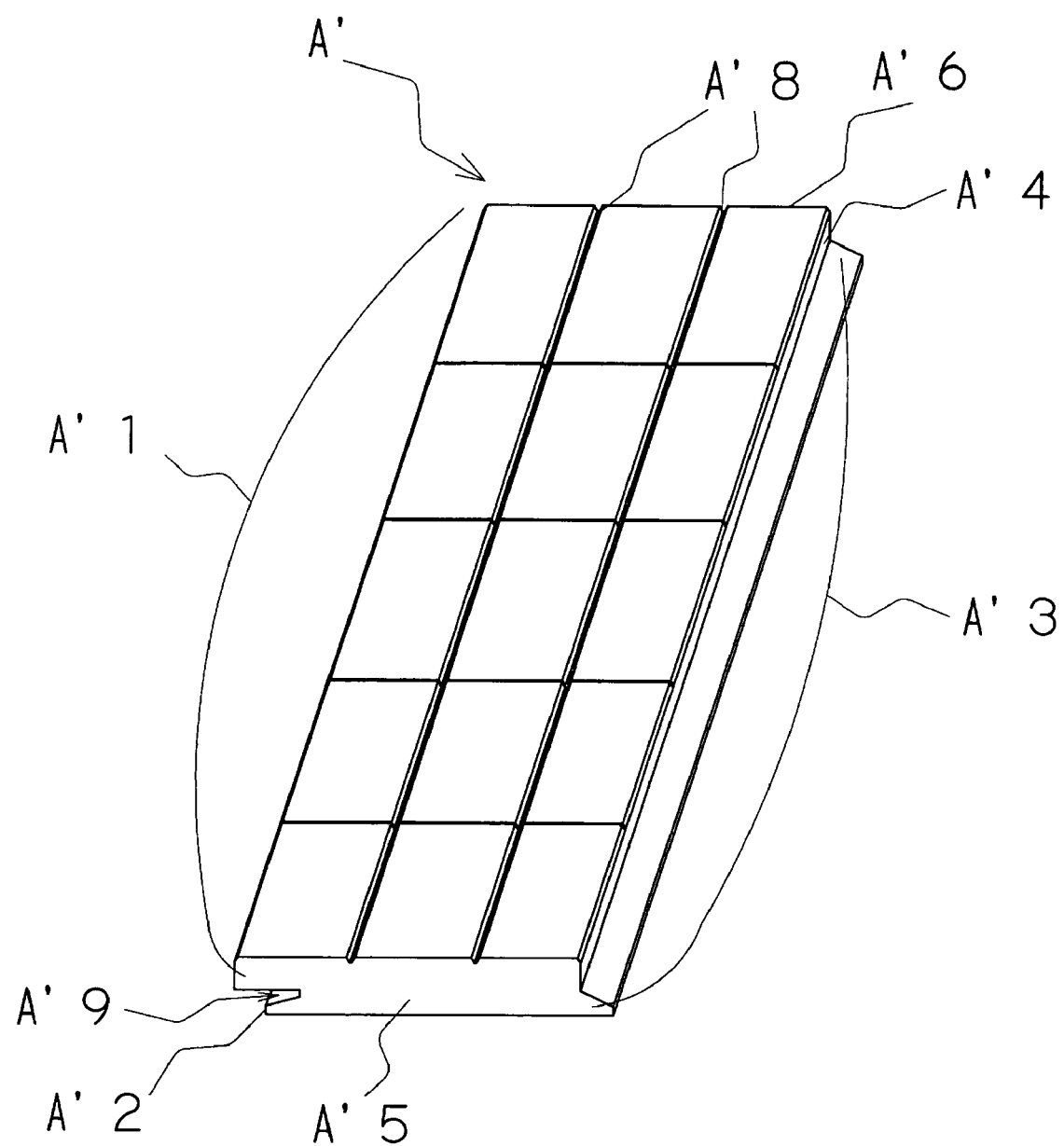
FIG. 16 is a view which showed other example of building board.

Furthermore, another building board A' having groove portion A'8 in surface and another convexoconcave in surface is shown in FIG. 16. Coating method of the present invention is applied to building board A', and design of building board is not limited. In addition, in building board A' shown by FIG. 16, shape of upper shiplap portion A'1 is different from shape of upper shiplap portion A1 in FIG. 15, and shape of edge side face A'2 under upper ship lap portion A'1 is different from shape of edge side face A2 in FIG. 15, and shape of lower shiplap portion A'3 is different from shape of lower shiplap portion A3 in FIG. 15. And in between upper shiplap portion A'1 and edge side face A'2 under upper shiplap portion A'1, notch A'9 is formed on the edge whole area. Coating method of the present invention is applied to upper shiplap portion A'1, edge side face A'2, lower shiplap portion A3', edge side face A'4 and notch A'9 with coating, and shape in widthwise direction of edge of building board having upper shiplap portion and lower shiplap portion is not limited.

In this disclosure and during the prosecution of this application, the terminology "present invention" or "invention" is meant as a non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features.

What is claimed is:

1. A coating method for coating a building board having an upper surface with both a convex portion and a concave portion, and the building board having side surfaces, comprising the steps of:

providing a transportation line for transporting a building board, a tank of a coating material having a drain hole at a lower end thereof and a stopper for regulating a flow of the coating material in proximity of the drain hole and inside the tank, the tank being disposed above the transportation line, and a flowing direction change member for the coating material being disposed along the transportation line;

transporting the building board on the transportation line under the tank, the upper surface of the building board facing to the drain hole of the tank;

supplying the coating material to the tank; and applying the coating material in the tank to the building board through the drain hole of the tank so that the coating material flows from the upper surface of the building board to the side surfaces thereof, while transporting the building board on the transportation line, wherein the building board has a side surface having a shiplap portion and a side edge face adjoined with and under the shiplap portion, the building board is placed on the transportation line so that the side surface having the shiplap portion and the side edge face is aligned with the transporting direction of the building board on the transportation line, the flowing direction change member is disposed on the transportation line along transporting direction of the building board and a part of the flowing direction change member is disposed directly under the shiplap portion of the transporting building board so that the flowing direction change member faces towards and is 5-50 mm away from at least one of the side surfaces having the shiplap portion and the side edge face of the building board, the drain hole width in a direction perpendicular to the transporting direction of the building board being wider than the building board width in a direction perpendicular to the transporting direction of the building board, the stopper size is bigger than the drain hole size and is located immediately above the drain hole of the tank, the coating material between the stopper and the drain hole flows out of the drain hole in a weight fed flow, the coating material is applied to the building board so that an amount of the coating material applied to the upper surface of the building board is 1200-1800 g/m$^2$, and a flowing direction of a part of the coating material flowing out from the drain hole is regulated by the flowing direction change member so that the shiplap portion and the side edge face of the building board are coated by the coating material.

2. The coating method as recited in claim 1, wherein the drain hole width in a direction along the transporting direction of the building board is 3-6 mm, and the coating material flows downwardly from the drain hole due to the weight of the coating material.

3. The coating method as recited in claim 1 or 2, wherein a space between an uppermost face of the upper surface of the building board being transported and a lowermost end portion of the drain hole that is closest to the building board is 20-100 mm.

4. The coating method as recited in claim 1, further comprising a step of spraying air onto the side surface having the shiplap portion and the side edge face of the building board from a lower diagonal direction of the building board on the transportation line, so that the coating material spreads over the side surface having the shiplap portion and the side edge face of the building board.

5. The coating method as recited in claim 1, wherein
the tank has inclined inner walls in proximity to the drain hole,
the stopper comprises plane portions, each of the plane portions being parallel to the inclined inner wall of the tank so that a flow of the coating material is regulated between the plane portions of the stopper and the inclined inner walls and the coating material flows downward in a weight fed flow from the drain hole of the tank.

6. The coating method as recited in claim 1, further comprising the steps of:
providing a recovery tank for recovering the coating material under the transporting line; and
transferring the coating material from the recovery tank to the tank so that the coating material is circulated therein.

7. The coating method as recited in claim 1, wherein the coating material is applied to the building board so that a whole of the upper surface and a whole of the side surfaces of the building board are coated with the coating material.

* * * * *